Nov. 6, 1928.　　　　　　　　　　　　　　　　1,690,861
H. S. JANDUS
CENTER CLAMP
Filed Jan. 17, 1927　　2 Sheets-Sheet 1

Herbert S. Jandus, Inventor

By Hull, Brock and West
Attorney

Nov. 6, 1928.
H. S. JANDUS
1,690,861
CENTER CLAMP
Filed Jan. 17, 1927   2 Sheets-Sheet 2
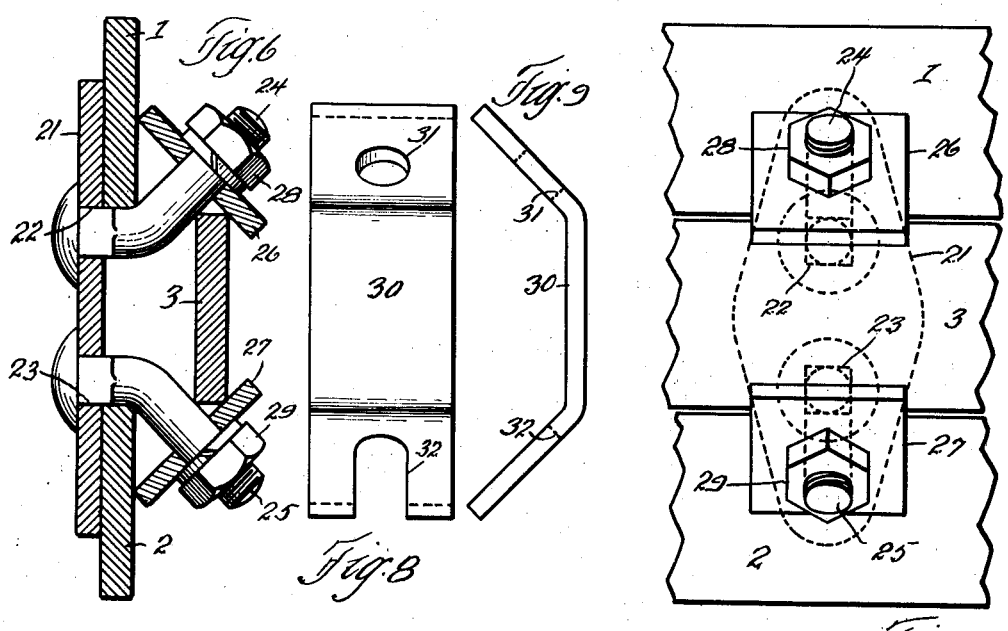
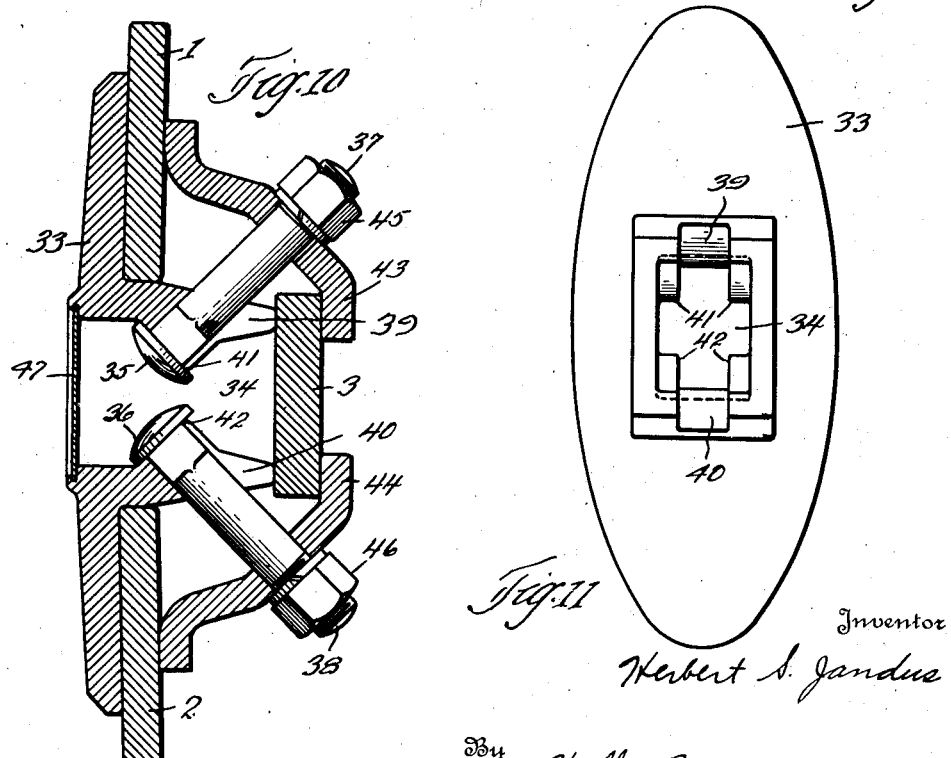
Inventor
Herbert S. Jandus
By Hull, Brock and West
Attorney Patented Nov. 6, 1928.

1,690,861

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

CENTER CLAMP.

Application filed January 17, 1927. Serial No. 161,506.

This invention relates to automobile bumpers, and more particularly to a center clamp for rigidly holding the rear bar of a bumper in proper position relative to a pair of vertically spaced impact bars. It is often desirable, in the construction of an automobile bumper of the type mentioned to have the vertically spaced impact members so close to each other that a bolt can not be passed directly from the front plate of the center clamp to the rear plate thereof without cutting holes or notches through the impact bars or the rear bar and thereby weakening the bars at this point. It is an object of this invention to provide a clamp which will hold the bars rigidly in such closely spaced position by the use of bolts, or other suitable means, connecting the clamp plates and passing between the impact and rear bars at an angle to the planes of said bars, and thereby avoiding the necessity of cutting holes or notches in the impact or rear bars. It is a further object of the invention to provide a clamp which is simple and economical of construction and which is convenient of application to the bumper bar assembly. Further advantages will appear from the description and drawings and from the use of the combinations of elements covered by the claims.

Figure 1:
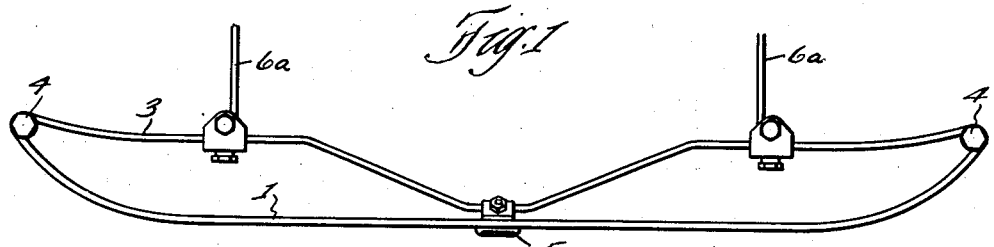
Figure 2:
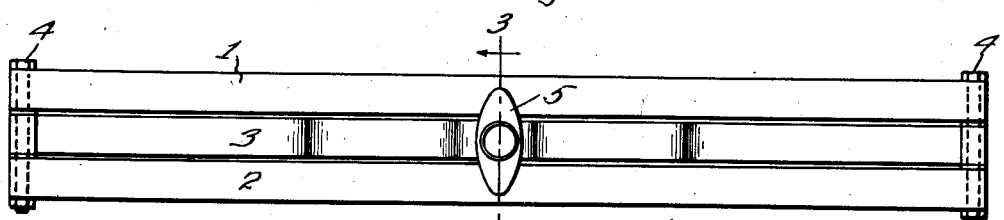
Figure 3:
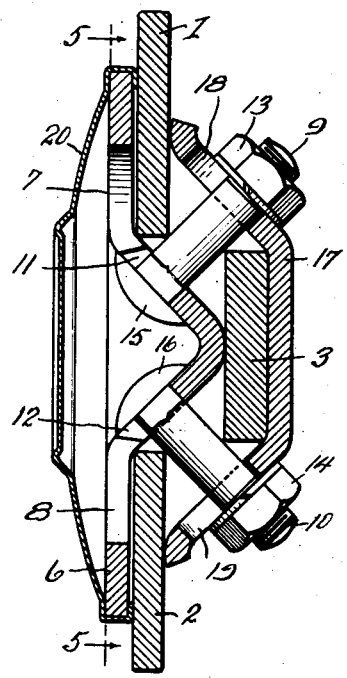
Figure 4:
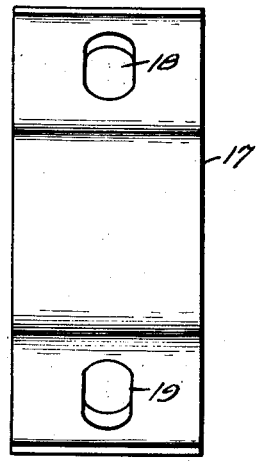
Figure 5:
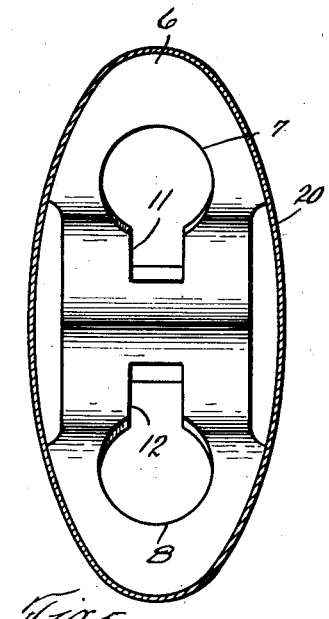

In the drawings Fig. 1 represents a plan view of a bumper having the center clamp attached; Fig. 2 shows a front elevation of the bumper shown in Fig. 1; Fig. 3 is a sectional view taken on the line 3—3 of Fig. 2; Fig. 4 is a rear view of the back plate of the clamp shown in Fig. 3; Fig. 5 is a sectional view taken on the line 5—5 of Fig. 3; Fig. 6 is a sectional view taken on the line 3—3 of Fig. 2 showing a modified form of center clamp; Fig. 7 is a rear detailed view of the center clamp shown in Fig. 6; Fig. 8 is a rear view of a modified type of rear plate for the center clamp; Fig. 9 is a side elevation of the plate shown in Fig. 8; Fig. 10 shows a sectional view taken on the line 3—3 of Fig. 2 showing a modified type of center clamp; Fig. 11 is a rear view of the front plate only of the center clamp shown in Fig. 10.

For convenience of description the bumper is to be considered as attached to the front end of a vehicle and the terms "front" and "rear" will be used with reference to this arrangement, but it is not intended that the use of the bumper should be limited to any particular position on the vehicle.

For description of the invention by reference characters shown in the drawings, 1 and 2 denote front bars for an automobile bumper which may be of the general type shown in the McGregor Patent 1,372,154 issued March 22, 1921, having a rear bar 3 attached at its ends to the front bar by means of bolts 4, and bent forward at its central portion for connection to the impact bars by means of a clamp 5 and having arms 6ª pivotally connected to the bar 3 for supporting the bumper from the automobile frame.

A front plate 6 of the center clamp shown in Fig. 3 is adapted at its ends to bear upon the front surfaces of the impact bars 1 and 2. Its central portion is bent rearwardly to form a V, the apex of which will bear upon the front surface of the rear bar 3 and the sides of which are provided with holes 7 and 8, large enough for the reception of the heads 15 and 16 of the bolts 9 and 10, and slots 11 and 12 extending from the holes 7 and 8 and of proper width to receive the stems and support the heads 15 and 16 of the bolts 9 and 10. The rear plate 17 of the clamp is adapted at its central portion to bear upon the rear surface of the rear bar 3 and is bent forward and upward at one end and forward and downward at its other end for contact with the rear surfaces of the impact bars 1 and 2. The rear plate 17 has two elongated holes 18 and 19 in the forwardly extending portions thereof, which may go to the ends of the plate if desirable, for the reception of the stems of the bolts 9 and 10. The light sheet metal plate 20 is applied to the front of the center clamp for ornamental purposes and to cover the bolt heads 15 and 16, and is held in place by having its edge bent around the edge of the front plate 6.

To assemble the center clamp, the plate 20 may be crimped over the rear edge of the plate 6. The bolt heads 15 and 16 may then be passed through the holes 7 and 8 and the stems of the bolts 9 and 10 slipped into the slots 11 and 12 in the front plate 6. The rear plate 17 is slipped over the bolts 9 and 10 and by tightening the nuts 13 and 14 the impact bars and the rear bar are held in proper spaced relation and the ornamental plate 20 is held rigidly in position. It is to be noted that the upper and lower edges of the rear bar 3 and the lower edge of the bar 1 and the upper edge of the bar 2 all bear upon the bolts 9 and 10 and so help to make the assembly more rigid and prevent rattling.

In the modified type of clamp shown in Figs. 6 and 7 the front plate 21 is a flat plate adapted to bear at its ends on the front surfaces of the bars 1 and 2 and having holes 22 and 23 to receive bolts 24 and 25 which pass between the vertically spaced impact bars 1 and 2. The plates 26 and 27 are flat plates each having a hole therein for the reception of the stems of the bolts 24 and 25 and are adapted to bear upon the rear surfaces of the impact bars and upon the rear corners of the rear bar 3. The bolts 24 and 25 are bent at such an angle as to just avoid the forward corners of the rear bar 3. By means of the nuts 28 and 29 on the bolts 24 and 25 the clamp plates are drawn together and the front and rear bars are held rigidly in place.

If desired, the plates 26 and 27 may be replaced by the single plate 30, shown in Figs. 8 and 9, having a hole 31 at one end and a notch 32 at the other.

In the modified type of clamp shown in Figs. 10 and 11, 33 denotes a front plate which may be cast or forged in the desired shape. The plate 33 is adapted at its upper and lower portions to bear upon the front surfaces of the impact bars 1 and 2 and has at its central portion a rearwardly projecting rectangular portion adapted to pass between the bars 1 and 2 and to bear at its rear face upon the front surface of the rear bar 3. In the rearwardly extending portion of the plate 33 there is an opening 34 to allow passage of the heads 35 and 36 of the bolts 37 and 38, and slots 39 and 40 in the upper and lower sides of such portion to receive the stems of the bolts 37 and 38, thereby providing seats 41 and 42 for the heads of the bolts 37 and 38. The two plates 43 and 44 are bent at their ends to bear upon the rear surfaces of the impact bars 1 and 2 and the rear surface of the rear bar 3 and have holes therein to receive the stems of the bolts 37 and 38. By tightening the nuts 45 and 46 the clamp plates will be drawn together and will hold the impact and rear bars in proper spaced relation. A suitable plate or covering may be added, as shown at 47, for ornamental purposes and to cover the bolt heads 35 and 36, or it may be made integral with the plate 33.

It is apparent that the several rear plates shown may be interchanged for use in any of the modified forms of center clamps and it is also apparent that a suitable ornamental cover such as that indicated at 20 in Fig. 3 could be added to the center clamps shown in Figs. 6 and 10.

Having thus described my invention, what I claim is:—

1. A clamp for spaced impact bars and the rear bar of an automobile bumper consisting of a front plate adapted to bear upon the front surfaces of the impact bars and having a rearwardly extending portion adapted to pass between the impact bars and bear upon the rear bar, a rear plate adapted to bear upon the rear surface of an impact bar and upon the rear surface of the rear bar, and means for drawing the two plates together.

2. A center clamp for connecting the spaced impact bars and the rear bar of a bumper, consisting of a front plate adapted to bear upon the front surfaces of the impact bars, a rear plate adapted to bear upon the rear surfaces of the impact bars and the rear surface of the rear bar, means integral with the front plate for spacing the rear bar from the impact bars and means for drawing the front and rear plates together.

3. In an automobile bumper, the combination of spaced impact bars, a rear bar adapted at its central portion for connection to the impact bars, and a center clamp for rigidly holding the bars in proper spaced relation, said center clamp consisting of a front plate adapted to bear at its end portions upon the front surfaces of the impact bars and at its central portion upon the front of the rear bar, a second plate adapted to bear upon the rear surfaces of the impact bars and upon the rear surface of the rear bar, and means for drawing the two plates together.

4. A clamp for securing the spaced impact bars to the rear bar of a bumper, including a front plate adapted to bear upon the front surfaces of the impact bars, a rear plate adapted to bear upon the rear surface of an impact bar and the rear surface of the rear bar, an ornamental plate adapted to be held in front of the front clamp plate by having a portion of it inserted between the impact bar and the front clamp plate, and means for drawing together the two clamp plates.

5. The combination with an automobile bumper having spaced impact bars and a rear bar, of a clamp having a front plate adapted to bear on the front surfaces of the impact bars and to project rearwardly between the impact bars, said rearwardly projecting portion being adapted to seat the head of a bolt extending rearwardly therefrom at an angle to the plane of the impact bars, and a rear plate adapted to bear on the rear surfaces of the impact and rear bars and having a hole therein for the reception of the aforementioned bolt.

6. The combination of an automobile bumper having impact bars spaced apart vertically and a rear bar spaced rearwardly therefrom, and a clamp for connecting said impact and rear bars, said clamp including a front plate adapted to bear upon the front surfaces of the impact bars, a rear plate adapted to bear upon the rear surface of an impact bar and the rear surface of the rear bar, and means for drawing said plates together, said means being adapted to pass between the impact and rear bars at an angle to the plane of the impact bars.

7. The combination with an automobile bumper, having impact bars spaced apart vertically and a rear bar having its central portion spaced rearwardly from, and in a plane parallel to, the plane of said impact bars, of a clamp having a plate adapted to bear upon the front surfaces of the impact bars and a second plate adapted to bear upon the rear surfaces of the impact and rear bars, and means passing between said impact and rear bars, and at an angle to the planes of said bars, for drawing said plates together.

8. A clamp having a front plate adapted to bear upon the front surfaces of vertically spaced impact bars of a bumper, and having its central portion projecting rearwardly between said impact bars and adapted to bear upon the front surface of a rear bar of the bumper and providing seats for the heads of bolts extending rearwardly from said front plate at an angle to the plane of the impact bars, and a rear plate adapted to bear upon the rear surfaces of the impact and rear bars, and having holes for the reception of the aforementioned bolts.

9. The combination with two bars spaced apart vertically and a bar spaced rearwardly therefrom and adapted to be connected thereto, of a clamp including a front plate adapted to bear upon the front surfaces of the vertically spaced front bars and upon the front surface of the rear bar, a rear plate adapted to bear upon the rear surface of a front bar and the rear surface of the rear bar and means for drawing together the two plates.

10. The combination with two bars spaced apart vertically and a bar spaced rearwardly therefrom and adapted to be connected thereto, of a clamp including a front plate adapted to bear upon the front surfaces of the vertically spaced front bars and upon the front surface of the rear bar, a rear plate adapted to bear upon the rear surface of a front bar and the rear surface of the rear bar and means for drawing together the two plates, said means consisting of a bolt passing between the front and rear plates in a position inclined to the plane of the rear bar.

11. The combination with two bars spaced apart vertically and a bar spaced rearwardly therefrom and adapted to be connected thereto, of a clamp including a front plate adapted to bear upon the front surfaces of the vertically spaced front bars, and a rear plate adapted to bear upon the rear surface of a front bar and the rear surface of the rear bar and means for drawing the two plates together, said means including a bolt connecting the plate and passing between the front bar and the rear bar at an angle to the plane of the rear bar.

12. The combination with two bars spaced apart vertically and a bar spaced rearwardly therefrom and adapted to be connected thereto, of a clamp including a front plate adapted to bear upon the front surfaces of the vertically spaced front bars, and a rear plate adapted to bear upon the rear surfaces of the front and rear bars and means for drawing the two plates together, said means including bolts connecting the plate and each passing between a front bar and the rear bar at an angle to the plane of the rear bar.

13. The combination with an automobile bumper, having impact bars spaced apart vertically and a rear bar having its central portion spaced rearwardly therefrom and adapted to be connected thereto, of a clamp having a plate adapted to bear upon the front surfaces of the impact bars and a second plate adapted to bear upon the rear surface of an impact bar and the rear surface of the rear bar and means passing between said impact and rear bars, at an angle to the plane of said rear bar, for drawing together said clamp plates.

14. A center clamp for connecting the vertically spaced impact bars and the rear bar of a bumper, including a front plate adapted to bear upon the front surfaces of the impact bars, a rear plate adapted to bear upon the rear surface of an impact bar and the rear surface of the rear bar, means connected with the front plate and extending between the impact bars for spacing the rear bar from the impact bars and means for drawing the front and rear clamp plates toward each other.

15. The combination with an automobile bumper having vertically spaced impact bars and a bar spaced rearwardly therefrom and adapted to be connected thereto, of a clamp including a front plate adapted to bear upon the front surfaces of the impact bars and having its central portion adapted to project rearwardly between the spaced impact bars and to bear against the front surface of the rear bar, said rearwardly projecting portion providing a seat for a bolt adapted to pass between an impact bar and the rear bar at an angle to the plane of the rear bar, a rear plate adapted to bear upon the rear surface of an impact bar and upon the rear surface of the rear bar and to be drawn toward the front clamp plate by means of the said bolt.

16. The combination with an automobile bumper having vertically spaced impact bars and a bar spaced rearwardly therefrom and adapted to be connected thereto, of a clamp consisting of a front plate adapted to bear upon the front surfaces of the impact bars and having its central portion adapted to project rearwardly between the spaced impact bars and to bear against the front surface of the rear bar, said rearwardly projecting portion providing slots for the stems, and seats for the heads, of bolts adapted to pass between the impact bars and the rear bar at an angle to the plane of the rear bar, and a rear plate adapted to bear upon the rear surfaces of the impact and rear bars and to be drawn toward the front clamp plate by means of the said bolts.

17. The combination with a bumper having vertically spaced impact bars and a bar spaced rearwardly therefrom and adapted to be connected thereto, of a clamp including a front plate adapted to bear upon the front surfaces of the impact bars and having its central portion adapted to project rearwardly between said impact bars and bear upon the front surface of the rear bar, said rearwardly projecting portion providing slots for the reception of the stems of, and seats for the heads of, a bolt adapted to pass between an impact bar and the rear bar at an angle to the plane of the rear bar, a rear clamp plate adapted to bear upon the rear surface of an impact bar and the rear surface of the rear bar and to provide a seat for a nut on the said bolt, said seat being parallel to the seat provided in the front plate for the head of the bolt.

18. The combination of a bumper having vertically spaced impact bars and a bar spaced rearwardly therefrom and adapted to be connected thereto, of a clamp including a front plate adapted to bear upon the front surfaces of the impact bars and to project rearwardly between the impact bars and bear upon the front surface of the rear bar, said rearwardly projecting portion providing slots for the stems of, and seats for the heads of, bolts adapted to pass between the impact bars and the rear bar at an angle to the plane of the rear bar, a rear clamp plate adapted to bear upon the rear surfaces of the impact and rear bars and to provide seats for nuts on the said bolts, said seats being parallel to the seats provided in the front clamp plate for the heads of the bolts.

19. The combination of a bumper having vertically spaced impact bars and a rear bar spaced therefrom and adapted to be connected thereto, of a clamp including a front plate adapted to bear upon the front surfaces of the impact bars and to project between the impact bars and bear upon the front surface of the rear bar, a rear plate adapted to bear upon the rear surface of an impact bar and the rear surface of the rear bar, said front and rear plates providing parallel seats for a clamping device for drawing the plates together.

20. The combination of a bumper having vertically spaced impact bars and a rear bar spaced therefrom and adapted to be connected thereto, of a clamp including a front plate adapted to bear upon the front surfaces of the impact bars and to project between the impact bars and bear upon the front surface of the rear bar, a rear plate adapted to bear upon the rear surfaces of the impact and rear bars, said plates providing parallel seats for the heads and nuts of bolts passing between the impact bars and the rear bar at an angle to the rear bar.

21. The combination with a pair of vertically spaced front bars and a bar spaced rearwardly therefrom, of a plate adapted to bear upon the front surfaces of said front bars, a plate adapted to bear upon the rear surface of a front bar and the rear surface of the rear bar, clamping means connecting said plates and passing between said bars at angles inclined thereto, said front plate and clamping means cooperating to prevent rotation of said clamping means.

22. The combination with a pair of spaced front bars and a rear bar, of a plate adapted to bear upon the front surfaces of said front bars and project between said front bars and bear on said rear bar, a plate adapted to bear upon the rear surfaces of a front and rear bar, and clamping means extending between said bars for drawing them together, said clamping means and front plate having cooperating means for preventing rotation of said clamping means.

23. The combination with a pair of vertically spaced bars and a bar spaced rearwardly therefrom, of a clamp plate adapted to bear upon the front surfaces of said front bars and having a rearwardly projecting portion adapted to pass between said front bars and bearing upon the front surface of said rear bar.

24. The combination with a pair of vertically spaced bars and a bar spaced rearwardly therefrom, of a clamp plate adapted to bear upon the front surfaces of said front bars and having a rearwardly projecting portion adapted to pass between said front bars and bearing upon the front surface of said rear bar, said clamp plate having in said rearwardly extending portion an aperture for the stem and a seat for the head of a bolt adapted to pass between the rear bar and a front bar.

In testimony whereof, I hereunto affix my signature.

HERBERT S. JANDUS.